United States Patent
Blair et al.

(10) Patent No.: US 10,281,887 B2
(45) Date of Patent: May 7, 2019

(54) OPTIMIZED COMMUNICATIONS WITH HART INSTRUMENTS

(75) Inventors: Richard Blair, Plaistow, NH (US); Robert Goczalk, Litchfield, NH (US)

(73) Assignee: Schneider Electric Industries SAS, Rueil Malmaison (FR)

( * ) Notice: Subject to any disclaimer, the term of this patent is extended or adjusted under 35 U.S.C. 154(b) by 949 days.

(21) Appl. No.: 14/405,998

(22) PCT Filed: Jun. 7, 2012

(86) PCT No.: PCT/US2012/041302
§ 371 (c)(1),
(2), (4) Date: Dec. 5, 2014

(87) PCT Pub. No.: WO2013/184113
PCT Pub. Date: Dec. 12, 2013

(65) Prior Publication Data
US 2015/0148918 A1   May 28, 2015

(51) Int. Cl.
*G05B 15/02* (2006.01)
*G05B 19/418* (2006.01)
*H04L 29/08* (2006.01)

(52) U.S. Cl.
CPC ......... *G05B 15/02* (2013.01); *G05B 19/4186* (2013.01); *H04L 67/10* (2013.01); *Y02P 90/185* (2015.11)

(58) Field of Classification Search
CPC ..... G05B 15/02; G05B 19/4186; H04L 67/10; Y02P 90/185
USPC .......................................................... 700/19
See application file for complete search history.

(56) References Cited

U.S. PATENT DOCUMENTS

| 7,941,581 | B2 | 5/2011 | Schwalbe et al. |
| 9,684,296 | B2 * | 6/2017 | Russell, III ........ G05B 19/0428 |
| 9,743,398 | B2 * | 8/2017 | Isaksson ........... H04W 72/0446 |
| 9,750,083 | B2 * | 8/2017 | Gidlund ................ H04W 88/16 |
| 9,903,749 | B2 * | 2/2018 | Wennerberg .......... G01F 23/284 |
| 2004/0259533 | A1 | 12/2004 | Nixon et al. |
| 2005/0256964 | A1 | 11/2005 | Dube et al. |
| 2007/0061018 | A1 | 3/2007 | Callaghan et al. |
| 2007/0078540 | A1 | 4/2007 | Bump et al. |
| 2009/0316628 | A1 * | 12/2009 | Enns ................. H04L 12/40006 370/328 |

(Continued)

FOREIGN PATENT DOCUMENTS

| EP | 1772785 A2 | 4/2007 |
| EP | 1816530 A1 | 8/2007 |
| WO | 2008024912 A2 | 2/2008 |

OTHER PUBLICATIONS

International Search Report and Written Opinion dated Mar. 1, 2013 (PCT/US2012/041302); ISA/EP.

(Continued)

*Primary Examiner* — Fernando Hidalgo
(74) *Attorney, Agent, or Firm* — Banner & Witcoff, Ltd.

(57) ABSTRACT

A device, such as a HART multiplexer, may allow access to one or more HART instruments from a single interface. The device may also support access to the HART instruments from a second interface. Requests for reading or writing data to or from a HART instrument may be combined at the device into a set of HART commands that may be more efficient than the HART commands that would be sent if each request was processed independently.

20 Claims, 3 Drawing Sheets

(56) References Cited

U.S. PATENT DOCUMENTS

2018/0046592 A1* 2/2018 Markovic ........... G06F 13/4022

OTHER PUBLICATIONS

International Search Report and Written Opinion dated Mar. 4, 2013 (PCT/US2012/041315); ISA/EP.
International Search Report and Written Opinion dated Dec. 7, 2012 (PCT/US2012/041330); ISA/EP.
International Search Report and Written Opinion dated Nov. 13, 2012 (PCT/US2012/041338); ISA/EP.
"FOUNDATION fieldbus Application Guide", fieldbus FOUNDATION, Dec. 4, 2002 (Dec. 4, 2002), XP002692169, Retrieved from the Internet: URL:http://www.fieldbus.org/images/stories/enduserresources/technicalreferences/documents/functionblockhybridbatchhse.pdf [retrieved on Feb. 14, 2013] Sections 1.5.2, 1.6.3, 4.3.4.
William R. Hodson: "Optimizing Fieldbus Link Schedules Makes a Difference", Honeywell Process Solutions, Oct. 27, 2005 (Oct. 27, 2005), XP002692170, Retrieved from the Internet: URL:http://www.isa.org/filestore/Division_TechPapers/GlassCeramics/TP05ISA006.pdf [retrieved on Feb. 4, 2013] p. 3, Issues 1 and 2.
ODVA: "The CIP Networks Library. vol. 1: Common Industrial Protocol (CIP), Edition 3.3", Common Industrial Protocol (CIP), vol. 1, Nov. 30, 2007 (Nov. 30, 2007), pp. i,1-6-1-9, XP002686255, Retrieved from the Internet: URL:ftp://ftp.heapg.com/AB-OCS/Ethernet%20IP%20CD/CIP/Vol1 3.3.pdf [retrieved on Oct. 31, 2012] pp. 1-6-pp. 1-9.

* cited by examiner

| Command | Values to Read | Bytes Used to Specify Values to Read | Bytes Needed To Respond To Command |
|---|---|---|---|
| 1 | Primary variable | 0 | 5 |
| 2 | Current, Percent of range | 0 | 8 |
| 3 | Current, Primary variable, Secondary variable, Tertiary variable, Quaternary variable | 0 | 9, 14, 19, 24 (depending upon number of variables supported) |
| 9 (HART 6) | Any 4 variables | 1, 2, 3, or 4 | 9, 17, 25, or 33 |
| 9 (HART 7) | Any 8 variables | 1, 2, ...7, or 8 | 13, 21, ... 61, or 69 |

Fig. 2

| Normal Scan | Interrupted Scan |
|---|---|
| Scan command to Instrument 130 | Scan command to Instrument 130 |
| Scan command to Instrument 131 | Scan command to Instrument 131 |
| Scan command to Instrument 132 | AMS Message to Instrument 130 |
| Scan command to Instrument 133 | Scan command to Instrument 132 |
| Scan command to Instrument 134 | Scan command to Instrument 133 |
| Scan command to Instrument 130 | Scan command to Instrument 134 |
| Scan command to Instrument 131 | Scan command to Instrument 130 |
| Scan command to Instrument 132 | Scan command to Instrument 131 |
| Scan command to Instrument 133 | Scan command to Instrument 132 |
| Scan command to Instrument 134 | Scan command to Instrument 133 |
| ... | ... |

Fig. 3

OPTIMIZED COMMUNICATIONS WITH HART INSTRUMENTS

CROSS REFERENCE TO RELATED APPLICATIONS

This application claims priority to PCT Application No. PCT/US2012/041302 filed on Jun. 7, 2012. This application is related by subject matter to the following applications: PCT Application No. PCT/US2012/041315; PCT Application No. PCT/US2012/041330 and PCT Application No. PCT/US2012/041338. All of the above-mentioned patent applications are herein incorporated by reference in their entireties.

BACKGROUND

Devices connected to an industrial network, such as a network with devices used in automation control or some other type of process control, may use various protocols to communicate with each other. Any one communication protocol may allow access to particular data throughout the network, but may not allow access to other data or devices. In addition, translating data requests from one protocol to another may result in inefficient and potentially duplicative network traffic. There is a need to improve communications efficiency for industrial networks that include more than one communication protocol.

SUMMARY

According to one aspect of the disclosure, a device may receive two or more requests that each require accessing data of a single HART instrument. One or more of these requests may be requests to access data of the single HART instrument on an ongoing basis. A scan cycle may be established in response to these requests.

According to another aspect of the disclosure, the two or more requests to access data of a single HART instrument may be analyzed to identify the set of data of the single HART instrument that needs to be accessed to fulfill the requests. A combination of HART commands that can be used to access all of this data may be identified.

According to a further aspect of the disclosure, the combination of HART commands that is identified may be made up of the smallest number of commands that can access all of the set of data. The identified combination of commands may be limited to commands that are supported by the single HART instrument.

According to yet another aspect of the disclosure, the identified set of commands may be sent to the single HART device. The response received from the single HART device may be used to generate replies to each of the two or more requests.

The preceding presents a simplified summary in order to provide a basic understanding of some aspects of the disclosure. The summary is not an extensive overview of the disclosure. It is intended neither to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and is not limited in the accompanying figures.

FIG. 2 illustrates several examples of HART commands that may be used to retrieve data from a HART instrument in accordance with various aspects of the disclosure.

FIG. 3 illustrates two examples of outputs of a HART multiplexer in accordance with various aspects of the disclosure.

DETAILED DESCRIPTION

In the following description reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

An industrial network may be used for a wide variety of purposes. Industrial networks are generally used to control or monitor industrial processes. For example, the amount of a fluid that is allowed into a mixing device may be controlled by actuating a valve in response to readings from one or more sensors. Industrial networks may be made up of any number of devices. These devices may be configured to communicate using various protocols, and the protocols may not be compatible with one another.

Figure 1:
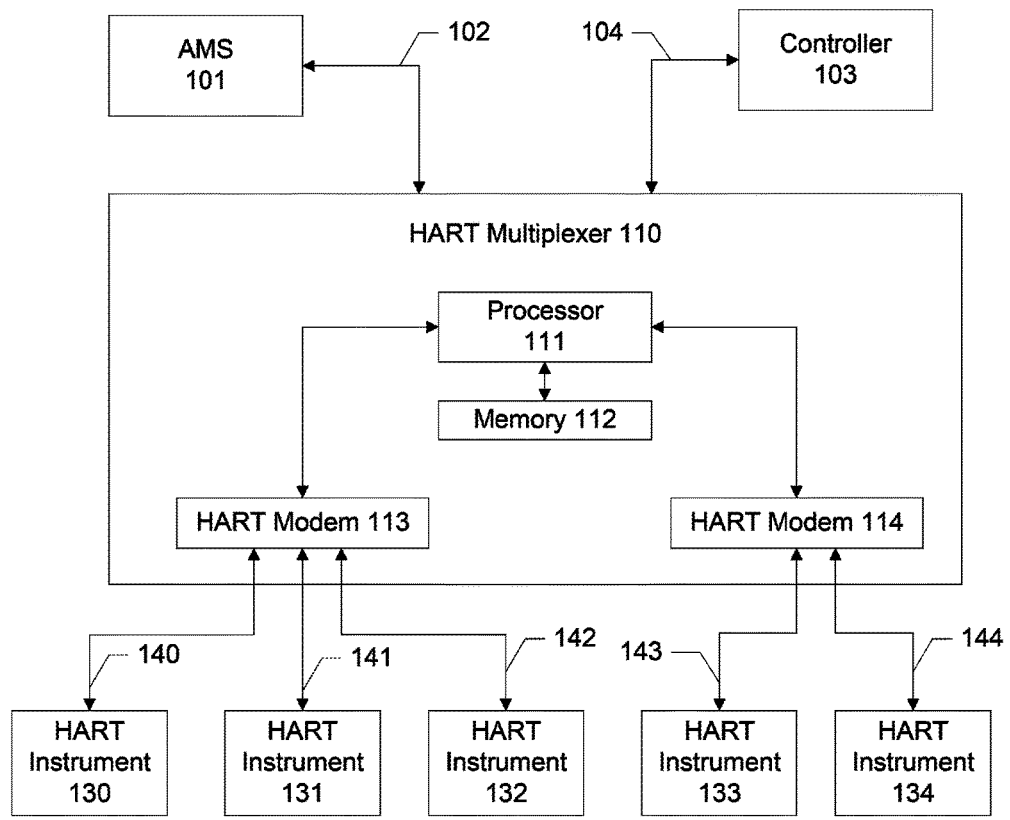
FIG. 1 illustrates an example of an industrial network in accordance with various aspects of the disclosure.

FIG. 1 illustrates an example of an industrial network. In this example, HART multiplexer 110 is in communication with HART instruments 130-134. Each HART instrument communicates with the HART multiplexer 110 using the Highway Addressable Remote Transducer (HART) protocol. This protocol allows for a single analog signal to be carried over a two-wire loop. Each of links 140-144 may be a two-wire loop. The analog signal values are represented by the current flowing through the two-wire loop, which ranges from 4 to 20 mA. Digital communications may be superimposed on the analog signal, allowing for additional data to be exchanged between each HART instrument 130-134 and the HART multiplexer 110. More than one instrument may be added to each two-wire loop. In this configuration, which is known as "multidrop mode," all communications for the additional instruments occur digitally, and each instrument on the two-wire loop is typically given a unique address. Examples of HART instruments may include sensors, transducers, or any other device that communicates using the HART protocol.

Asset management software (AMS) 101 communicates with HART multiplexer 110. The asset management software may run on any computing device. Communications between AMS 101 and HART multiplexer 110 are illustrated by link 102. Communications over link 102 may take place using, for example, the Arcom protocol, which is a protocol designed for communicating with a HART multiplexer. The HART multiplexer 110 multiplexes signals from each HART instrument (130-134) onto communication link 102, thereby allowing asset management software 102 to communicate with each HART instrument 130-134 via a single communications link.

Asset management software is typically used to monitor the status of an industrial network. This often involves repeatedly checking the status of various sensors, valves, or other HART instruments. HART multiplexer 110 may help facilitate these checks by retrieving data from HART instruments automatically on an ongoing basis. By automatically retrieving data from HART instruments on an ongoing basis (which is sometimes referred to as "scanning"), the HART multiplexer may improve the speed with which it can provide data to the asset management software.

Controller 103 also communicates with HART multiplexer 110. Controller 103 may be any type of controller, such as, for example, a programmable logic controller. Communications between controller 103 and HART multiplexer 110 are illustrated by link 104. Link 104 may be, for example, an Ethernet link. Communications over link 104 may take place using, for example, the MODBUS protocol. Other examples of protocols that may be used to communicate between HART multiplexer 110 and controller 103 include the EtherNet/IP, DeviceNet, ProfiNet, and ProfiBus communications protocols. Any other industrial networking communications protocol may also be used. None of the listed protocols are compatible with the HART protocol. HART multiplexer 110 may respond to communications received on link 104 in the same format as the received request. For example, if a MODBUS request for data is received via link 104, HART multiplexer 110 may include the requested data in a MODBUS reply message. The requested data may have come from, for example, HART instrument 131. Thus, the HART multiplexer may translate requests from controller 103 into a HART message, send that message to a HART instrument, and translate the reply from the HART instrument into a message that controller 103 can understand. The HART multiplexer may also scan the HART instruments in order to pre-fetch the data that is likely to be requested by controller 103. The pre-fetched data may be used to improve the speed with which the HART multiplexer responds to requests from controller 103. The data to be scanned may be determined automatically by the HART multiplexer by analyzing data frequently requested by controller 103. The data to be scanned may also be configured by a user.

Requests for data received in protocols that are not designed to interoperate with HART devices may be accommodated by creating a mapping between aspects of the protocol and the data of the HART devices. For example HART variables may be mapped to MODBUS registers. Ethernet Industrial Protocol ("EtherNet/IP") objects may be created for HART devices, and data fields of the EtherNet/IP objects may correspond to HART variables, as described in PCT Application No. PCT/US2012/041302, titled "System and Method For Accessing Information Using Objects." This application, which is filed on the same day as the patent application that the instant patent application claims priority, is hereby incorporated by reference in its entirety.

Many additional devices may be added to the industrial network illustrated in FIG. 1. For example, a human-machine interface may also communicate with HART multiplexer 110 in order to monitor and report information about the HART instruments. Instruments besides HART instruments may also exist on the network. These other instruments may, for example, communicate with controller 103 directly. Further, more instances of each element shown in FIG. 1 may exist. For example, there may be more HART instruments than instruments 130-134. Also, there may be more than one HART multiplexer. Each HART multiplexer may be connected to the same AMS and the same controller. Alternatively, or in addition, additional controllers or additional AMS instances may be used. Additional alterations may also be made to the industrial network illustrated in FIG. 1. For example, controller 103 may be modified to include HART multiplexer 110 as one of its components. If HART multiplexer 110 is incorporated into controller 103, controller 103 may still include an Ethernet port for communications with other outside devices, such as instruments that communicate using protocols other than HART, other controllers, and other computing devices.

HART multiplexer 110 includes processor 111, which may be configured to receive messages from AMS 101, controller 103, HART modems 113-114, or any other devices. The software that configures processor 111 may be stored in memory 112. This software may include an operating system with applications running thereon. Memory 112 may also store other data, such as data read from HART instruments 130-134. Memory 112 may include read-only memory (ROM) and random access memory (RAM). Some or all of the software, memory, and microprocessor just described may also be embodied in an application specific integrated circuit (ASIC), a field programmable gate array (FPGA), or the like.

Each of the devices depicted in FIG. 1 may include one or more components, such as a processor, memory, and communications interface, similar to those shown for HART multiplexer 110.

FIG. 2 illustrates several examples of HART commands that may be used to retrieve data from a HART instrument. These commands are merely examples. The HART protocol includes many commands in addition to those illustrated in FIG. 2. Column 201 lists the number of the HART command. Column 202 lists the values that each command instructs the instrument receiving the command to read. Notice that some commands have been redefined over time in the HART protocol specification. As shown in FIG. 2, command 9, as of HART protocol version 6, may be used to read any four variables. But as of HART protocol version 7, command 9 may be used to read any eight variables.

Column 203 of FIG. 2 lists the number of bytes that must be sent by multiplexer 110 to specify the values to be read. Zero bytes are needed for commands 1, 2, and 3 because the values to be read are pre-defined for commands 1, 2, and 3. For command 9, on the other hand, a byte is needed to specify each variable to be read.

Column 204 of FIG. 2 lists the number of bytes that a HART instrument will send to multiplexer 110 in response to a command. For example, an instrument will respond to command 1 by sending 5 bytes. One of these bytes represents the units in which the variable is being sent. The other four bytes represent the value of the variable itself.

FIG. 3 illustrates two examples of outputs of HART multiplexer 110. Each of these outputs may occur after the HART multiplexer is instructed to automatically retrieve data from HART instruments on an ongoing basis. As illustrated in FIG. 3, the data to be retrieved automatically is retrieved from each instrument using a "scan command." The particular command or commands that make up the "scan command" may differ for each HART instrument. For example, if the AMS software requests the "primary variable" from instrument 130 (but no other information), then the scan command for instrument 130 may be HART command 1. If the AMS software requests the primary, secondary, and tertiary variables from instrument 131, then the scan command for instrument 131 may be HART command 3, which retrieves these three variables, as well as some others.

Column 301 shows an uninterrupted sequence of scan commands. These commands may be output by HART multiplexer 110 when the multiplexer does not receive other inputs from AMS 101 or controller 103. The scan commands are sent repeatedly, which enables the HART multiplexer to always have the most up-to-date information from each instrument.

Column 302 shows a sequence of HART commands that may be output by HART multiplexer 110 when the multiplexer receives an input from AMS 101 or controller 103. As seen at command 310, the normal sequence of scan commands may be interrupted in order to include a message dictated by the AMS. For example, the AMS may request an additional variable from instrument 130 beyond the variables included in the normal scan. As illustrated in column 302, the normal sequence of scan commands is interrupted at slot 310 in order to insert a command requesting the additional information for the AMS. The normal sequence of scan commands may resume after the input from the AMS has been handled. The normal sequence of scan commands may be interrupted in order to send any type of HART command, including read commands, write commands, and other commands, such as device configuration commands. AMS software 101, or another connected device, may specify these commands directly. Alternatively, a connected device may make a request that HART multiplexer 110 must process in order to fulfill. For example, controller 103 may send a command using the Ethernet/IP protocol that the HART multiplexer translates into a series of HART commands. Multiplexer 110 may interrupt the normal series of scan commands to insert the series of HART commands.

It is possible to modify the normal series of scan commands instead of interrupting the normal series of scan commands. For example, the normal series of scan commands may read the primary variable from instrument 134 using command 1. Multiplexer 110 may receive a request for the secondary, tertiary, and quaternary variable of instrument 134. Instead of interrupting the normal series of scan commands, multiplexer 110 may substitute command 3 for command 1 when it next outputs a scan command to instrument 134. Another alternative is to send command 3 immediately, thereby obtaining the recently requested information along with the information that would have been retrieved by the normal scan command. The next scan command for instrument 134 may be skipped. Alternatively, the next scan command for instrument 134 might not be skipped. If the next scan command for instrument 134 is not to be skipped, then multiplexer 110 might not ensure that the information normally obtained by the scan command is also obtained during the request that interrupts the normal scan sequence.

Whether to interrupt or alter the normal sequence of scan commands may be determined based on, for example, a priority of the request for additional information. A high priority request may interrupt the normal sequence of scan commands, but a lower priority request may not. The location of the multiplexer in its sequence of scan commands may also affect whether multiplexer 110 interrupts its normal sequence of scan commands. For example, a request for data from instrument 131 may need to be fulfilled in 500 ms. It may be possible to fulfill this request in 500 ms by scanning instrument 131 in sequence, but using a modified scan command instead of the normal scan command for instrument 131. If, however, a scan of instrument 131 is not scheduled to occur soon, interrupting the normal sequence of scan commands may be necessary to ensure that the requested data is obtained within 500 ms.

In addition to combining normally scheduled scan commands with commands received from other devices, commands received from other devices can also be combined with one another. For example, AMS 101 may request that HART command 3 be sent to instrument 134. This command reads current and the primary through quaternary variables. Controller 103 may issue a command that requires three additional variables to be read from instrument 134. Multiplexer 110 may process these command individually, by, for example, sending command 3 in response to the request from AMS 101 and sending command 9 in response to the request from controller 103. But multiplexer 110 may also combine processing of these commands by, for example, sending a single command 9 to instrument 134 that requests not only the data requested by controller 103 but also the data specified by command 3. Thus, one HART command may be directed to instrument 134 instead of two separate commands.

Multiplexer 110 may reformat the data it receives from instrument 134. Because, in this example, the AMS requested that command 3 be sent, multiplexer 110 may reformat the relevant portions of the data it received in response to sending command 9 into the format used for responding to command 3. The reformatted data may then be sent to the AMS. Similarly, multiplexer 110 may send to controller 103 only the data requested by controller 103.

The process of combining commands may also be used to identify the normal scan commands themselves. For example, the HART multiplexer may identify that a first set of data needs to be scanned for AMS 101, and that a second set of data needs to be scanned for controller 103. The HART multiplexer may combine these first and second sets into a third set using a union operation. The HART multiplexer may use this third set to identify which commands will be the normal scan commands for each instrument. This procedure may help optimize the size of the set of normal scan commands.

Figure 4:
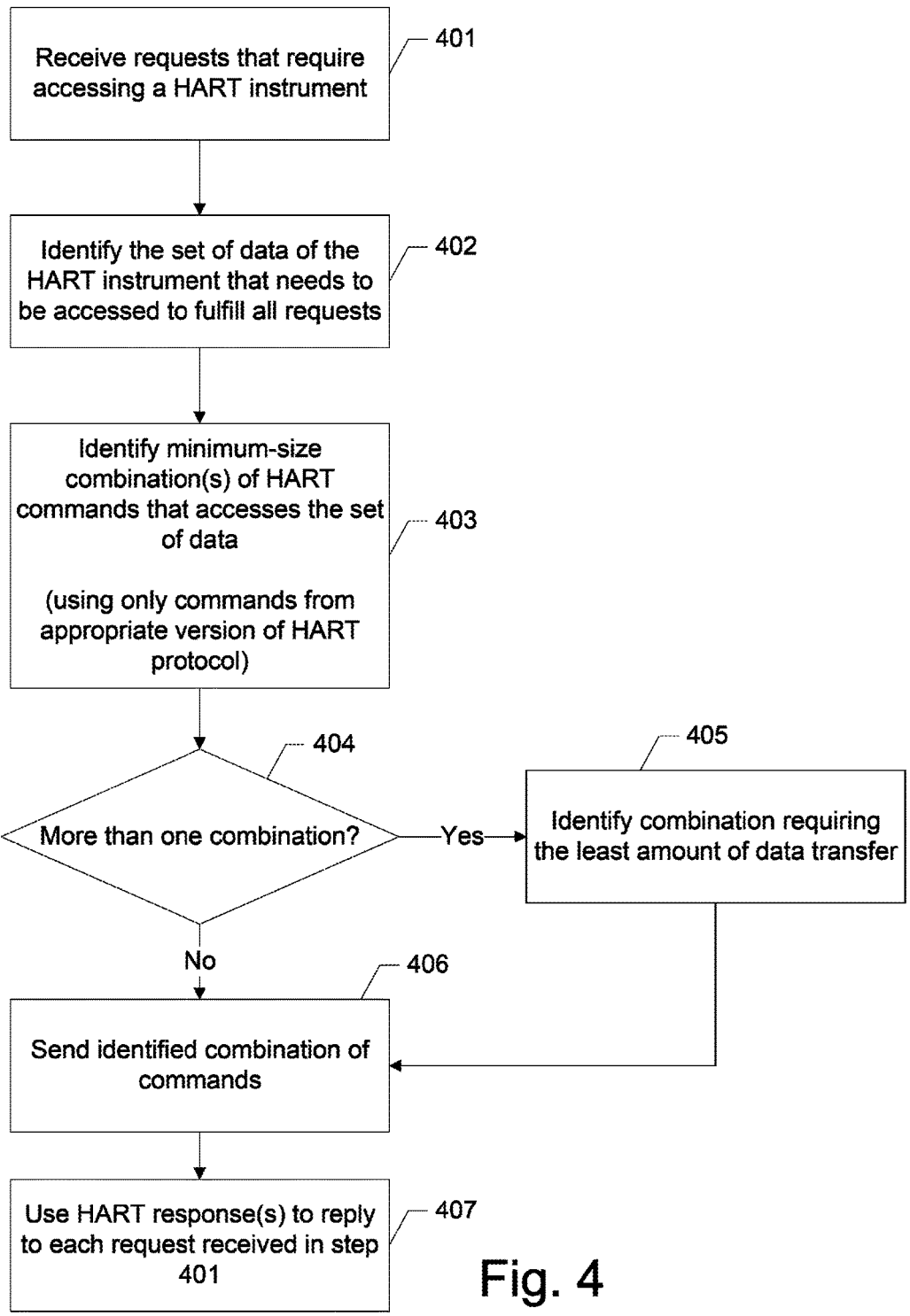
FIG. 4 illustrates an example of a method that a device may use to determine which HART commands to send to a HART instrument in accordance with various aspects of the disclosure.

FIG. 4 illustrates an example of a method that a device, such as multiplexer 110, may use to determine which HART commands to send to a HART instrument. The device may communicate with one or more HART instruments. In step 401, the device receives requests that require accessing a HART instrument. One example of a request is a request to provide data on an ongoing basis. (Such requests may be fulfilled by using, for example, a multiplexer's normal scan cycle.) Other examples of requests include other communications from AMS 101 or controller 103. Received requests may be combined because, for example, the requests were received simultaneously or closely together in time. Another example of when received requests may be combined is when the received request is being combined with a request that is part of the device's normal scan cycle. Combining multiple requests to scan data with one another may make the device's normal scan cycle more efficient than processing each scan request separately.

In step 402, the received requests are inspected, and the set of data that needs to be accessed from the HART instrument to fulfill all of the received requests is identified. This set of data is the union of the data needed to fulfill each request individual request. For example, if one request needs to access the primary and secondary variables and another needs to access the secondary and tertiary variables, then the set of data that needs to be accessed includes the primary, secondary, and tertiary variables.

Although the example used so far has involved requests to receive data from the HART instrument, requests to write data to the HART instrument may also be combined. If a request is made to both read from and write to the same variable, then the device must determine if the read request is required to be performed first. If the read request does not need to occur first (because, for example, the read request is merely part of the normal scan cycle), then the read request may be omitted in step 402. Writing to the variable, but not reading from it, may be equivalent to assuming that the read request came second. The value that is written to the variable can be used as the device's response to the read request.

In step 403, the device identifies the smallest combination of HART commands that accesses the set of data identified in step 402. The smallest combination is the combination that includes the fewest number of individual HART commands. When determining this set, the device might use only HART commands that are supported by the HART instrument. For example, if the HART instrument only supports version 6 of the HART protocol, then no combinations will be identified that read more than four variables with command 9. (Reading more than 4 variables with command 9 was first introduced in version 7 of the HART protocol.)

If more than one combination of commands is identified in step 403 (as determined by step 404), then one of the combinations identified in step 403 may be chosen in step 405. Because step 403 identifies combinations that include the fewest number of individual HART commands, each combination considered in step 405 already includes this minimum number of commands. In step 405, the device identifies which combination of commands requires the least amount of data transfer between the HART instrument and the device. The data transfer considered in step 405 may include data used to specify which values to read, as illustrated in column 203 of FIG. 2. The data transfer considered in step 405 may also include data needed to respond to a command, as illustrated in column 204 of FIG. 2. If two or more combinations of commands include the same number of commands and require the same amount of data transfer, then an additional tie-breaking rule may be used to choose between them. The tie-breaking rule may include choosing one of the combinations arbitrarily.

In step 406, the identified combination of commands is sent to the HART instrument. As discussed above, the identified combination may be sent as part of a HART multiplexer's normal scan cycle. Alternatively, the identified combination may interrupt the normal scan cycle. Further, the identified combination may be sent by a device that does not perform a normal scan cycle.

In step 407, the response(s) from the HART instrument to the commands sent in step 406 are used by the device to appropriately reply to each request that was received in step 401.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps described above may be performed in other than the recited order, including concurrently, and that one or more steps may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A programmable logic controller for optimizing industrial communications comprising:
   one or more communication interfaces, which are configured to connect to at least a first instrument;
   one or more Ethernet ports;
   a processor; and
   a memory storing executable instructions that configure the programmable logic controller to:
      receive at least one request at a first instrument via the one or more Ethernet ports that requires accessing first data of the first instrument automatically on an ongoing basis;
      generate a normal scan cycle that includes requesting the first data of the first instrument using a first command;
      generate a request for second data of the first instrument;
      determine a combination of one or more commands, wherein the determined combination includes the minimum number of commands needed to access all of the first data and the second data; and
      for one scan cycle, send the determined combination of one or more commands to the first instrument instead of the first command.

2. The programmable logic controller of claim 1, wherein the first instrument comprises a Highway Addressable Remote Transducer (HART) instrument.

3. The programmable logic controller of claim 1, wherein at least one of the communication interfaces is configured to connect to one or more other outside device using an Arcom protocol.

4. The programmable logic controller of claim 1, wherein the combination is determined by identifying which of a plurality of combinations of HART commands each include the same number of HART commands requiring the least amount of data transfer between the programmable logic controller and a first HART instrument.

5. The programmable logic controller of claim 2, wherein the instructions further configure the programmable logic controller to:
   determine which version of a HART protocol is supported by the HART instrument; and
   limit one or more derived command elements of the determined combination of one or more commands to commands that are supported by the version of the HART protocol supported by the HART instrument.

6. The programmable logic controller of claim 2, wherein one of at least two received requests is a request that at least one data item be retrieved from the HART instrument automatically on an ongoing basis.

7. The programmable logic controller of claim 1, wherein one of the at least one received request is a request received using a MODBUS protocol.

8. The programmable logic controller of claim 1, wherein one of the at least one received request is a request received using an EtherNet/IP protocol.

9. The programmable logic controller of claim 2, wherein the instructions further configure the programmable logic controller to:
   after transmitting the processed minimum number of HART commands, receive a response from the HART instrument;

use a first portion of the data included in the response to send a first reply to one of the at least one received request; and use a second portion of the data included in the response to send a second reply to a second one of the at least one received request; and wherein the first portion and the second portion are different.

10. A method for optimizing industrial communications for a programmable logic controller comprising:

receiving, at least one request at a first instrument via one or more Ethernet ports that requires accessing a first data of the first instrument automatically on an ongoing basis;

generating, a normal scan cycle that includes requesting the first data of the first instrument using a first command;

generating, a request for second data of the first instrument;

determining, a combination of one or more commands, wherein the determined combination includes the minimum number of commands needed to access all of the first data and the second data; and for one scan cycle, sending the determined combination of one or more commands to the first instrument instead of the first command.

11. The method of claim 10, wherein the first instrument comprises a Highway Addressable Remote Transducer (HART) instrument utilizing a HART protocol.

12. The method of claim 11, wherein determining the combination of one or more of commands comprises:

identifying which of a plurality of combinations of HART commands each include the same number of the HART commands requiring the least amount of data transfer between the programmable logic controller and the HART instrument.

13. The method of claim 11, further comprising:

identifying which version of the HART protocol is supported by the HART instrument; and limiting commands included in the determined combination of one or more commands to commands that are supported by the identified version of the HART protocol.

14. The method of claim 11, wherein the programmable logic controller comprises a HART multiplexer and one of said at least one request is a request that at least one data item be retrieved from the HART instrument automatically on an ongoing basis.

15. The method of claim 14, wherein another of said at least one request is also a request that at least one data item be retrieved from the HART instrument automatically on an ongoing basis.

16. The method of claim 14, wherein the HART multiplexer establishes a normal scan cycle that includes retrieving the at least one data item from the HART instrument using a first set of one or more HART commands; and in response to identifying said combination of one or more HART commands, not sending the first set of one or more HART commands for one scan cycle.

17. The method of claim 11, wherein the programmable logic controller comprises a HART multiplexer and one of said at least one request is a request received from a connected device using a MODBUS protocol.

18. The method of claim 11, wherein the programmable logic controller comprises a HART multiplexer and one of said at least one request is a request received from a connected device using an EtherNet/IP protocol.

19. The method of claim 11, further comprising:

after sending the identified combination of one or more HART commands to the HART instrument, receiving a response from the HART instrument;

using a first set of the data included in the response to send a first reply to one of said at least one request; and using a second set of the data included in the response to send a second reply to a second one of said at least one request.

20. The method of claim 19, wherein the first set and the second set are different.

* * * * *